United States Patent
Choi et al.

(10) Patent No.: US 7,835,456 B2
(45) Date of Patent: Nov. 16, 2010

(54) SPUR MITIGATION TECHNIQUES

(75) Inventors: Won-Joon Choi, Cupertino, CA (US); Jeffrey M. Gilbert, Sunnyvale, CA (US); Yi-Hsiu Wang, Palo Alto, CA (US); Xiaoru Zhang, San Jose, CA (US)

(73) Assignee: Atheros Communications, Inc., San Jose, CA (US)

( * ) Notice: Subject to any disclaimer, the term of this patent is extended or adjusted under 35 U.S.C. 154(b) by 0 days.

(21) Appl. No.: 11/952,040

(22) Filed: Dec. 6, 2007

(65) Prior Publication Data

US 2008/0123761 A1 May 29, 2008

Related U.S. Application Data

(62) Division of application No. 11/461,347, filed on Jul. 31, 2006, now Pat. No. 7,321,631, which is a division of application No. 10/664,792, filed on Sep. 16, 2003.

(51) Int. Cl.
*H04L 27/28* (2006.01)
(52) U.S. Cl. .................... 375/260; 375/316
(58) Field of Classification Search ............ 375/260, 375/316
See application file for complete search history.

(56) References Cited

U.S. PATENT DOCUMENTS

| | | | | |
|---|---|---|---|---|
| 5,471,508 A * | 11/1995 | Koslov | ........................ | 375/344 |
| 5,502,603 A | 3/1996 | Kohno et al. | | |
| 5,751,700 A | 5/1998 | Imaeda | | |
| 5,838,799 A | 11/1998 | Cioffi et al. | | |
| 6,252,900 B1 | 6/2001 | Liu et al. | | |
| 6,345,377 B1 | 2/2002 | Kroeger et al. | | |
| 6,393,068 B1 * | 5/2002 | Rupp | .......................... | 375/326 |
| 6,445,693 B1 | 9/2002 | Sarraf et al. | | |
| 6,459,404 B1 | 10/2002 | Nussbaum et al. | | |
| 6,487,253 B1 * | 11/2002 | Jones et al. | .................. | 375/260 |
| 6,765,969 B1 * | 7/2004 | Vook et al. | ................... | 375/259 |
| 6,934,340 B1 | 8/2005 | Dollard | | |
| 7,218,691 B1 * | 5/2007 | Narasimhan | ................ | 375/344 |
| 7,221,722 B2 * | 5/2007 | Thomas et al. | .............. | 375/346 |
| 7,324,606 B2 * | 1/2008 | Eilts et al. | ..................... | 375/316 |
| 2001/0036235 A1 * | 11/2001 | Kadous | ....................... | 375/341 |
| 2002/0001352 A1 * | 1/2002 | Stirling-Gallacher et al. | .... | 375/260 |
| 2002/0034213 A1 * | 3/2002 | Wang et al. | .................. | 375/132 |
| 2002/0041635 A1 | 4/2002 | Ma et al. | | |
| 2002/0051498 A1 | 5/2002 | Thomas et al. | | |
| 2002/0085641 A1 | 7/2002 | Baum | | |
| 2002/0110138 A1 * | 8/2002 | Schramm | .................... | 370/430 |

(Continued)

*Primary Examiner*—Temesghen Ghebretinsae
(74) *Attorney, Agent, or Firm*—Bever, Hoffman & Harms, LLP; Jeanette S. Harms

(57) ABSTRACT

Spurs cause significant problems with signal detecting, amplifier gain adjustment, and signal decoding. Various techniques can be used to mitigate the effects of spurs on a received signal. Generally, these techniques work by either canceling or ignoring the spurs. For example, a pilot mask can be used to ignore pilot information in one or more sub-channels. A Viterbi mask can determine the weighting given to bits in a sub-channel based on spur and data rate information. Channel interpolation can compute a pseudo channel estimate for a sub-channel known to have a spur location can be computed by interpolating the channel estimates of adjacent good sub-channels. Filtering of the received signal using a low-pass filter, a growing box filter, or a low-pass filter with self-correlation can be used to cancel a spur.

10 Claims, 10 Drawing Sheets

U.S. PATENT DOCUMENTS

| | | |
|---|---|---|
| 2002/0178449 A1 | 11/2002 | Yamamoto et al. |
| 2002/0181390 A1* | 12/2002 | Mody et al. .................. 370/208 |
| 2003/0031278 A1* | 2/2003 | Kang et al. .................. 375/341 |
| 2003/0058951 A1* | 3/2003 | Thomson et al. ............. 375/260 |
| 2003/0072254 A1* | 4/2003 | Ma et al. ..................... 370/208 |
| 2003/0081695 A1* | 5/2003 | Eilts et al. ................... 375/316 |
| 2003/0108127 A1* | 6/2003 | Eilts et al. ................... 375/340 |
| 2003/0128656 A1* | 7/2003 | Scarpa ........................ 370/203 |
| 2003/0128751 A1* | 7/2003 | Vandenameele-Lepla ... 375/229 |
| 2003/0169682 A1* | 9/2003 | Chen et al. .................. 370/206 |
| 2003/0231582 A1 | 12/2003 | Logvinov et al. |
| 2004/0028154 A1* | 2/2004 | Yellin et al. ................. 375/341 |
| 2004/0081076 A1 | 4/2004 | Goldstein et al. |
| 2004/0203442 A1* | 10/2004 | Krishnan et al. ......... 455/67.11 |
| 2004/0218519 A1* | 11/2004 | Chiou et al. ................. 370/203 |
| 2004/0264362 A1 | 12/2004 | Rhodes |
| 2004/0264587 A1* | 12/2004 | Morejon et al. ............. 375/260 |
| 2005/0063327 A1* | 3/2005 | Krauss et al. ............... 370/320 |
| 2006/0133529 A1* | 6/2006 | Lee et al. .................... 375/260 |
| 2008/0043888 A1* | 2/2008 | Bhukania et al. ............ 375/346 |

* cited by examiner

SPUR MITIGATION TECHNIQUES

RELATED APPLICATIONS

This application is a divisional of U.S. patent application Ser. No. 11/461,347, entitled "Spur Mitigation Techniques" filed Jul. 31, 2006 now U.S. Pat No. 7,321,631 which is a divisional of U.S. patent application Ser. No. 10/664,792, entitled "Spur Mitigation Techniques" filed Sep. 16, 2003.

BACKGROUND OF THE INVENTION

1. Field of the Invention

The present invention relates to wireless local area networks (WLANs) and in particular to various techniques that ignore or cancel spurs, thereby improving receiver performance.

2. Discussion of the Related Art

Wireless local area networks (WLANS) are becoming increasingly popular as communication networks. The IEEE 802.11 standards provide guidelines for the operation of devices operating in WLANs. To address multipath and other conditions, a wireless system can employ various techniques. One such technique is Orthogonal Frequency Division Multiplexing (OFDM).

In an OFDM system, a signal can be split into multiple narrowband channels (called sub-channels) at different frequencies. For example, current 802.11a and 802.11g OFDM systems include 52 sub-channels. Thus, a transmitted signal could be represented by $x_{-26} \ldots x_{-1}, x_1 \ldots x_{26}$, wherein both negative and positive side frequencies are included. In this configuration, each sub-channel carries a portion of the signal. Each sub-channel is "orthogonal" (i.e. independent) from every other sub-channel. Multipath conditions and noise can result in deterioration of this orthogonality.

In an attempt to restore orthogonality, the 1999 IEEE 802.11a standard provides that a transmitted data packet includes a preamble, which precedes the actual data. Note that all references to the 802.11a standard, which operates in the 5 GHz band, equally apply to the newer 802.11g standard, which operates in the 2.4 GHz band. FIG. 1 illustrates a portion of a data packet 100 including a preamble 105. As defined in the 802.11a standard, preamble 105 includes 10 "short" identical known symbols 101A-101J of 0.8 μsec (hereinafter shorts 101) concatenated to 2 "long" identical known symbols 102A-102B of 3.2 μsec (hereinafter longs 102). Note that a symbol refers to any waveform at discrete moments in time (e.g. represented as voltage versus time).

Longs 102 can be used to provide channel estimation. Specifically, because longs 102 are known, the receiver can use these symbols to provide channel estimations for a subsequent data symbol 103 in the data packet. In this manner, longs 102 can thereby increase the likelihood that the received data symbols can be correctly interpreted. Longs 102 are also called "training" symbols because they can "train" an equalizer, e.g. a frequency domain equalizer, to learn about channel conditions.

The 802.11a standard also provides that guard intervals (GIs) should be placed before longs and data. Specifically, a double guard interval (GI2) is placed before long symbols 102A-102B, thereby forming part of longs 102. In contrast, a regular guard interval (GI) is placed before data 103A, thereby forming part of data symbol 103. The double guard interval, as the name implies, is twice as long as the regular guard interval.

Shorts 101 can be used to determine a frequency offset between the oscillators in the receiver and transmitter. Additionally, shorts 101 can be used to provide initial system time synchronization. System time synchronization can also be continuously tuned using the data symbols.

A difference between the frequency of the transmitter and receiver oscillators can adversely and significantly impact system performance. For example, if the receiver's clock is not aligned with the incoming data, then sampling of the received signal could be sub-optimal. Additionally, phase noise in the radio-frequency synthesizers in the transmitter or receiver can degrade performance. For this reason, "pilots", also known signals (e.g. −1 and 1 in a pre-determined pattern) defined by the 802.11a standard, are provided on 4 of the 52 orthogonal sub-channels to track and correct the difference between clocks.

For example, FIG. 2 illustrates a data symbol 200 including a GI 201 and data 202. If the receiver's clock samples earlier in time than the incoming data, then instead of detecting the values indicated by $1^{st}$ sampling 203, the values indicated by $2^{nd}$ sampling 204 could be detected. This de-synchronization can result in a phase ramp 300 in the frequency domain, as shown in FIG. 3. Note that phase ramp 300 is negative when the receiver's clock samples earlier in time than the incoming data and positive when the receiver's clock samples later in time than the incoming data. Because of the continual "slide" in sampling (see FIG. 2), the slope of the phase can continue to rotate symbol by symbol.

Moreover, when a signal is transmitted, the signal is modulated by the channel frequency, thereby improving its propagation properties in the channel. The modulation is based on the clock at the transmitter. Thus, at the receiver, the signal must be demodulated. This demodulation can result in some residual phase error, which can be represented by an offset 301. The 4 pilots provided by the 802.11 standard are used to track the phase slope and phase offset, thereby allowing the system to compensate for such slope and offset when necessary.

Unfortunately, using only four sub-channels can be insufficient to compensate for phase slope and offset. For example, certain narrow tones, called "spurs" can corrupt the pilots provided on these four sub-channels, thereby distorting the phase slope and phase offset information derived from such pilots. The spurs can be generated by an oscillator and/or synthesizer provided in the receiver, as now described in reference to FIG. 4A.

WLAN Receiver: Overview

FIG. 4A illustrates a simplified receiver 400 for receiving signals in a WLAN environment. In receiver 400, a bandpass (BP) filter 402 receives the incoming signals from an antenna 401 and outputs a predetermined band of frequencies (while excluding those frequencies higher and lower than the predetermined band). A variable gain RF amplifier 403 can provide an initial amplification to that predetermined band of frequencies. A mixer 404 converts those amplified signals into intermediate frequency (IF) signals, which are then amplified by an IF amplifier 405.

At this point, mixers 406 and low pass filters 407 (including both I and Q branches) can generate signals in the desired channel (called the baseband signals). Amplifiers 408 then amplify these baseband signals. Analog to digital converters (ADCs) 410 (provided for both the I and Q branches of low pass filters 407) transform the amplified baseband signals into digital signals that can be analyzed by a processing block 411. Processing block 411 determines the modulation type of the detected signal and provides this determination to an appropriate decoder in a decoder block 412 for system optimization, thereby allowing the originally transmitted signal to be recovered.

Of importance, a reference oscillator 420 in receiver 400 provides its clock to synthesizers 423 and 424 as well as to other components in receiver 400. Synthesizers 423 and 424 generate local oscillations 421 and 422, respectively, using the frequency of reference oscillator 420. For example, synthesizer 423 could generate a 2.4 GHz frequency for local oscillation 421 from a 32 MHz frequency provided by reference oscillator 420. Note that in some embodiments, synthesizers 423 and 424 can be combined into a single synthesizer capable of generating multiple frequencies.

Unfortunately, the frequency of reference oscillator 420 (a square wave signal) creates harmonics (both odd and even) of the reference frequency (e.g. 32 MHz×n). These harmonics can include spurs, i.e. known frequency spectra unrelated to a received signal, which can adversely affect the front end of receiver 400, particularly RF amplifier 403. Spurs can be present at harmonics near the desired received signal.

For example, if the radio is to tune to 2.4 GHz, then synthesizer 423 could be set to 1.92 GHz and synthesizer could be set to 0.48 GHz (because 1.92 GHz=0/48 GH=2.4 GHz). If the synthesizers generate these frequencies from a 32 MHz reference oscillator, then spurs can be generated at 2.4 GHz (32 MHz×75), 2.432 GHz (32 MHz×76), and 2.464 GHz (32 MHz×77). FIG. 4B illustrates an exemplary spur 430 generated at 2.432 GHz. Of importance, spur 430 coincides with a pilot 431 (one of four pilots indicated by a cross-sectional pattern) provided within the 52 sub-channels of this 17 MHz wide band. Note that although spur 430 is a narrow band frequency, the strength of spur 430 can affect other sub-channels adjacent to the sub-channel including spur 430 as indicated by curves 432 (also known as skirts). Other spurs, not shown, could coincide with and/or affect other pilots, data, and the shorts/longs in the preamble.

Of importance, a spur is mixed with a signal received by antenna 401. Therefore, spurs cause significant problems with signal detecting, amplifier gain adjustment, and signal decoding. Thus, a need arises for a technique of mitigating the effects of such spurs, thereby improving the performance of the receiver.

SUMMARY OF THE INVENTION

In accordance with the present invention, various techniques can be used to mitigate the effects of spurs on a received signal. In general, these techniques work by either canceling or ignoring the spurs. These techniques can include, but are not limited to, filtering, interpolating, and masking. Exemplary techniques are now further described.

A method of improving receiver performance by avoiding bad pilots is provided. To avoid bad pilots, a pilot mask can be used in the receiver. The pilot mask includes a set of flags, wherein the set of flags is associated with certain sub-channels. Advantageously, each flag in the set determines whether its associated sub-channel is usable for pilot tracking. Thus, if a spur coincides with or otherwise affects a sub-channel, then the pilot mask will not allow that sub-channel to be used for pilot tracking. In one embodiment, the set of flags includes 52 flags associated with 52 sub-channels. The pilot mask is usable for any data rate.

A method of improving signal decoding in a receiver is also provided. In this method, each sub-channel can be designated either a good sub-channel or a bad sub-channel. Any otherwise good sub-channel including a spur can be converted to a bad sub-channel. The bits of a signal in a good channel can be weighted more than bits in a bad sub-channel. This weighting can also consider data rate information. The weighted information can be provided to a decoder. In one embodiment, a Viterbi mask implements the weighting and the decoder is a Viterbi decoder.

A decoding circuit in a receiver is also provided. The decoding circuit can include a Viterbi decoder and a Viterbi mask in operative relation to the Viterbi decoder. Of importance, the Viterbi mask provides a weighted channel estimate for each sub-channel based on spur information. In one embodiment, the Viterbi mask provides the weighted channel estimate based on data rate information.

A filter system for canceling a spur from a signal is also provided. This filter system can include first and second mixers, a low-pass filter, and an adder. The first mixer can be used to rotate the signal such that the spur frequency is at 0 frequency (i.e. DC). The low-pass filter performs its computation on that rotated signal to filter out everything but the spur. Note that the rotation by the first mixer generates a signal with 0 frequency offset, thereby allowing the low-pass filter to advantageously remove the non-spur components of the signal. The second mixer can be used for rotating the resulting filtered spur signal back to its original frequency. The adder can subtract the re-rotated signal from the original signal.

In one embodiment, the low-pass filter can be implemented using a growing box filter. This growing box filter can include two accumulators. A first accumulator can provide a cumulative sum of samples. A second accumulator can provide a total sum of all samples to a current symbol.

A method for canceling a spur from a signal is also provided. In this method, the signal can be rotated to generate a first rotated signal in which the spur frequency is at 0 frequency. A computation based on the first rotated signal can be performed to generate a filtered spur signal in which only the rotated spur signal remains. The filtered spur signal can be rotated back to its original frequency to generate a second rotated signal. At this point, the second rotated signal can be subtracted from the original signal.

In one embodiment, performing the filtering computation can include setting a sample set size. A cumulative sum can be computed for the sample set over time. When the sample set size is reached, then the cumulative sum can be added to a total sum and the cumulative size can be reset to zero. An estimated spur value can be computed by dividing the total sum by a total number of samples. This estimated spur value can be provided as the filtered signal. Periodically, the sample set size can be increased over time. In one embodiment, if the cumulative sum is denoted by $cs[n]$ and the total sum is denoted by $ts[n]$, then adding the cumulative sum to the total sum and resetting the cumulative size to zero occurs when n is a power of 2.

A method of improving a channel estimate for a received signal is also provided. In this method, a channel estimate for a plurality of sub-channels of the received signal can be determined. If a sub-channel includes a spur, then that sub-channel estimate is ignored. An average sub-channel estimate can be computed, wherein the average channel estimate is based on sub-channels adjacent the sub-channel with the spur. This average sub-channel estimate can be used as the sub-channel estimate for that sub-channel.

A method for canceling a spur from a signal is also provided. In this method, the signal can be rotated to generate a first rotated signal in which the spur frequency is at 0 frequency. A computation can be performed based on the first rotated signal to generate a filtered spur signal in which only the rotated spur signal remains. The resulting filtered spur signal can be rotated back to its original frequency to generate a second rotated signal.

In one embodiment, the self-correlation of the original signal can be computed to generate a modified signal. At this point, the second rotated signal can be subtracted from the modified signal. In another embodiment, the second rotated signal can be subtracted from the original signal to generate a modified signal. After subtracting, self-correlation of the modified signal can be computed.

A filter system for canceling a spur from a signal is also provided. The filter system includes a first mixer, a low-pass filter, a self-correlation block, a second mixer, and a spur removal means. The low-pass filter receives an output of the first mixer which has rotated the original signal such that the spur frequency is at 0 frequency. The low-pass filter performs its computation to generate a filtered spur signal in which only the spur signal remains. The second mixer receives an output of the low-pass filter and rotates the filtered spur signal back to its original frequency. In one embodiment, the spur removal means receives the original signal and an output of the second mixer, whereas the self-correlation block receives the output of the spur removal means. In another embodiment, the self-correlation block performs its computation on the original signal and the spur removal means receives outputs of the self-correlation block, the first mixer, and the second mixer.

DETAILED DESCRIPTION OF THE DRAWINGS

Spurs can cause receiver performance degradation in various ways. For example, spurs can corrupt information in the received signal used for data decoding, signal detection, timing, and frequency offset. Multiple techniques, described below, can be used to mitigate the effects of spurs. These techniques can ignore and/or cancel the spurs.

Pilot Mask

One known pilot-tracking algorithm is discussed in U.S. patent application Ser. No. 10/263,415, entitled "Decision Feedback Channel Estimation and Pilot Tracking For OFDM Systems", filed on Oct. 1, 2002, and incorporated by reference herein. In one embodiment, this pilot-tracking algorithm can use the four pilots on the pilot sub-channels as well as information from certain data sub-channels to compute frequency offset. For example, the 48 data sub-channels could be partitioned into 4 groups, wherein each group includes 12 sub-channels. The receiver could then select the sub-channel in each group having the maximum channel power.

In this embodiment, the four pilots and the four pseudo-pilots (information from the selected data sub-channels) can be weighed by their channel estimates for calculating frequency offset. Unfortunately, pseudo-pilot sub-channels with spurs could be chosen based on their power and given a disproportionate weight due to such power. Therefore, spurs can severely degrade the performance of this pilot-tracking algorithm.

Figure 5:
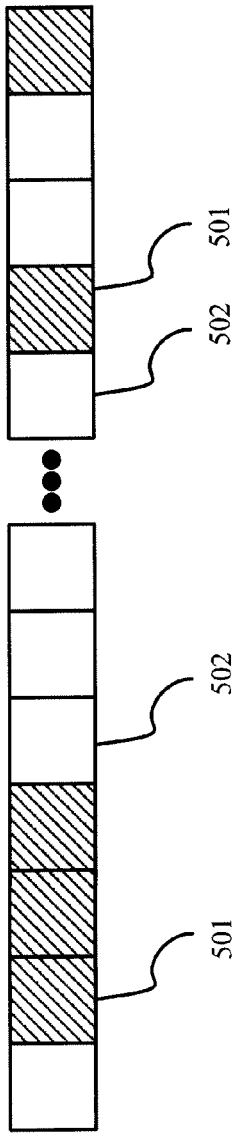
FIG. 5 illustrates an exemplary set of hard masks that could be used to determine which of the 52 sub-channels can be used for pilot tracking.

In accordance with one embodiment of the invention, a pilot mask can be used to avoid bad pilots (including actual pilots and pseudo-pilots). For simplicity, a set of 52 flags can be provided for the 52 sub-channels. In this case, each flag will determine whether to use a particular sub-channel for pilot tracking. For example, if a spur (which has a known frequency) will coincide with a sub-channel, then the pilot mask will not allow that sub-channel to be used for pilot tracking (hence the pilot mask is considered a "hard" mask). Advantageously, because the performance of the pilot-tracking algorithm is relatively insensitive to how many sub-channels are masked, one pilot mask can generally be provided for all the data rates. FIG. 5 illustrates an exemplary pilot mask 500 including a plurality of flags, wherein flags (with fill pattern) 501 indicate sub-channels that cannot be used for pilot tracking and flags (without fill pattern) 502 indicate sub-channels that can be used for pilot tracking.

Puncturing Using a Viterbi Mask

Figure 1:
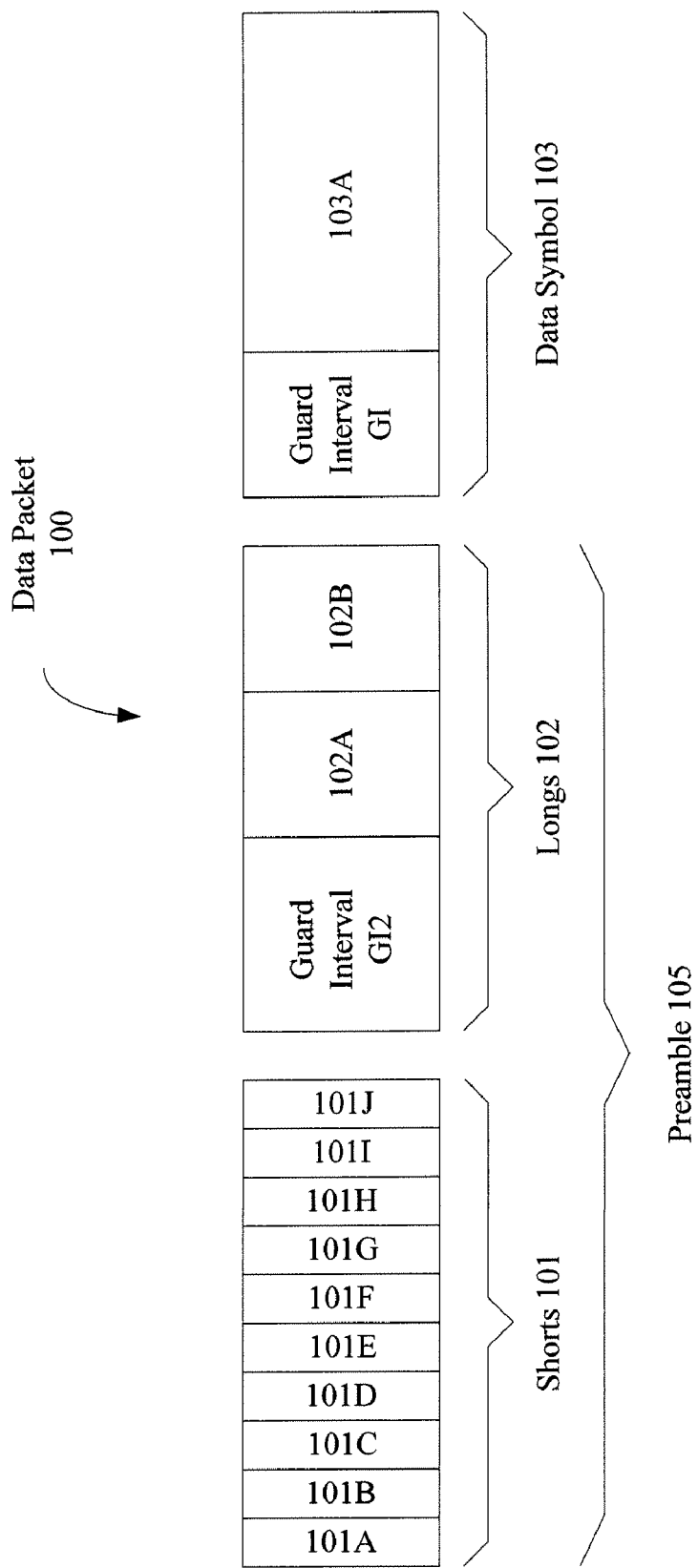
FIG. 1 illustrates a portion of an exemplary OFDM data packet.
Figure 2:
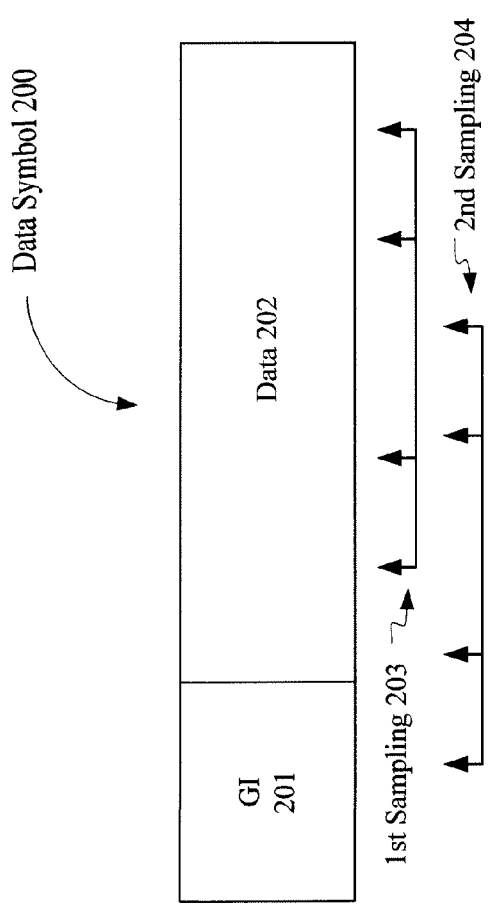
FIG. 2 illustrates the effect of non-synchronized clocks for a transmitter and a receiver on the sampling of an exemplary data symbol.
Figure 3:
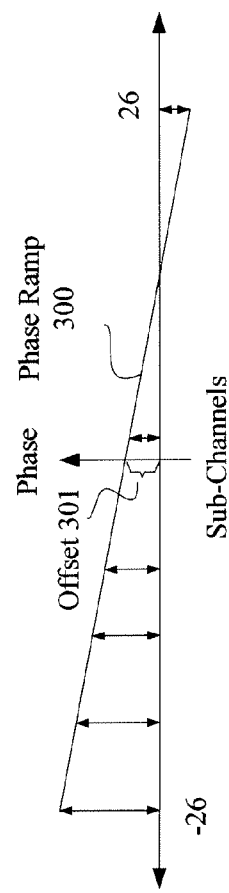
FIG. 3 illustrates a phase ramp and phase offset in the frequency domain caused by the de-synchronization shown in FIG. 2.

As described in reference to FIG. 1, longs can be used to provide channel estimation. Specifically, a transmitter includes known information on each sub-channel to allow the receiver to accurately estimate the sub-channel. The receiver includes a Viterbi decoder to decode the received signal based on the sub-channel estimates.

To reflect sub-channel conditions in the Viterbi decoder, thereby improving signal decoding, the bits being transmitted in a "good" sub-channel can be weighted more than bits transmitted in a "bad" sub-channel. In accordance with one embodiment of the invention, a Viterbi mask can take into account spurs that occur within or affect predetermined sub-channels. In other words, even if sub-channel SB1 is a "good" channel and therefore would normally have a weight greater than a "bad" channel, the presence of a spur within sub-channel SB1 should significantly reduce its weight to accurately reflect the condition of that sub-channel.

Including the effect of a spur in a sub-channel is called "puncturing". A Viterbi mask indicates the amount of puncturing by providing a weighted value for each sub-channel. Because the Viterbi mask provides a weighting for each sub-channel it is considered a "soft" mask (in contrast to the "hard" pilot mask). In one embodiment, the weighting value can be set between 0 and 1 (e.g. $0 \leq$ weighting value $\leq 1$). The higher the weighting value, the less the spur affects that sub-channel. Thus, a weighting value of 1 indicates that the spur has effectively no effect on that sub-channel.

In one embodiment, because puncturing has different impacts on different data rates, multiple sets of Viterbi masks can be provided. For example, puncturing logically affects a received signal having one bit per channel (a typical low data rate) less than a received signal having six bits per channel (a typical high data rate). However, the spurs tend to distort more sub-channels for low data rate signals than for high data rate signals. The soft Viterbi mask can effectively compute an appropriate weighting to be used for each sub-channel. For example, for bits of low data rate signals, the weightings provided in a Viterbi mask (for 7 sub-channels having a spur at the $4^{th}$ sub-channel) could be [1, ½, ½, ¼, ½, ½, 1]. In contrast, for bits of high data rate signals, the weightings provided in a Viterbi mask (also for 7 sub-channels having a spur at the $4^{th}$ sub-channel) could be [1, 1, ¼, 1/16, ¼, 1, 1].

Figure 6:
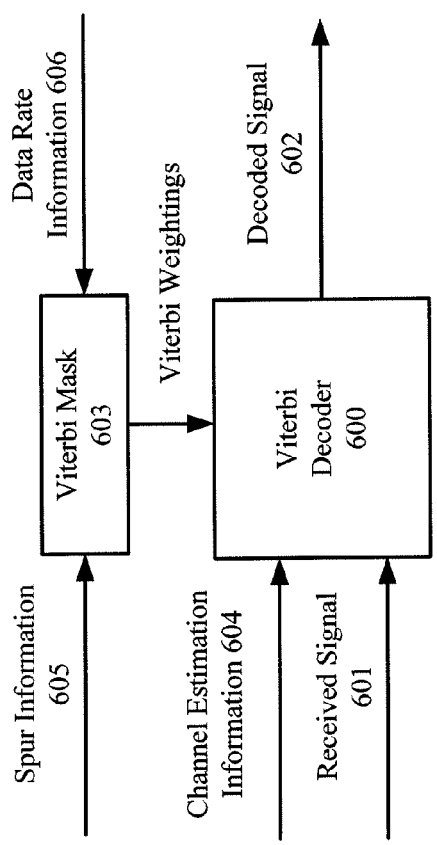
FIG. 6 illustrates a technique wherein a Viterbi decoder receives a signal and outputs a decoded signal. The Viterbi decoder ignores certain sub-channels based on a Viterbi mask.

FIG. 6 illustrates a technique wherein a Viterbi decoder 600 receives a signal 601 as well as channel estimation information 604 and outputs a decoded signal 602. In this technique, a Viterbi mask 603 can advantageously receive spur information 605 and data rate information 606. The resulting sub-channel weights computed for Viterbi mask 603 can be multiplied by the associated sub-channel estimates in Viterbi decoder 600 to accurately decode received signal 601.

Providing weighting in a Viterbi decoder based on only channel estimation information is described in U.S. patent application Ser. No. 09/816,810, entitled "Decoding System and Method for Digital Communications", which was filed on Mar. 24, 2000 by Atheros Communications, Inc., and is incorporated by reference herein.

Spur Filtering for Data

In accordance with one embodiment of the invention, the receiver can estimate the spur and cancel it out. This technique can be particularly useful with high data rates, wherein spurs can undesirably distort significant numbers of encoded bits in the received signal.

Figure 7:
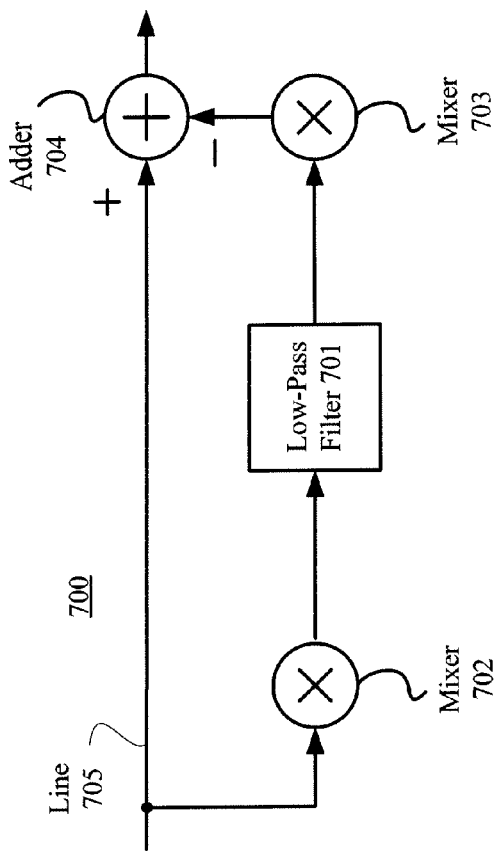
FIG. 7 illustrates a simplified filter system that includes a low-pass filter used to cancel spurs.

FIG. 7 illustrates a simplified filter system 700 that operates collectively as a narrowband notch filter to cancel spurs. As noted previously, the frequency of the spur is known. A low-pass filter 701 can use this frequency to accurately estimate the spur.

To illustrate how low-pass filter 701 works, consider a simple model without noise and a spur as expressed by the following two equations, respectively.

$$y[n]=x[n]+s[n]$$

$$s[n]=Ae^{j2\pi f_s nT}$$

where y[n] is the simple model without noise, x[n] is the time-domain signal of the received signal (e.g. a data signal), s[n] is the spur signal, A is a complex value including the phase and amplitude, $f_s$ is the spur frequency, n is the index of particular sample, and T is the sampling period.

At this point, the received signal can be rotated such that the spur frequency is at 0 frequency (i.e. at DC). This rotation, which can be performed by mixer 702, can be expressed by the following equation.

$$z[n]=y[n]e^{-j2\pi f_s nT}$$

Low-pass filter 701 can then easily estimate the spur (i.e. filter out everything but the spur signal) using the following equation, wherein h[k] is the filter coefficient.

$$\hat{A} = \sum_{k=0}^{l-1} h[k]z[n-k]$$

wherein l is the filter length.

This filtered signal is then rotated in the opposite direction by mixer 703, thereby returning the spur signal to its original frequency. Using adder 704 (which can perform both adding and subtracting operations), the spur effect can be cancelled from the received signal on line 705 in accordance with the following equation.

$$w[n]=y[n]-\hat{A}e^{j2\pi f_s nT}$$

Of importance, low-pass filter 701 needs to be applied fast enough so that there are still significant data remaining. However, to minimize distortion of the received signal, low-pass filter 701 needs to be very narrow, which corresponds to having a long filter in the time domain. A long filter implies an intense computation, a large memory to provide this computation, and an undesirably long delay in generating this computation.

Figure 8A:
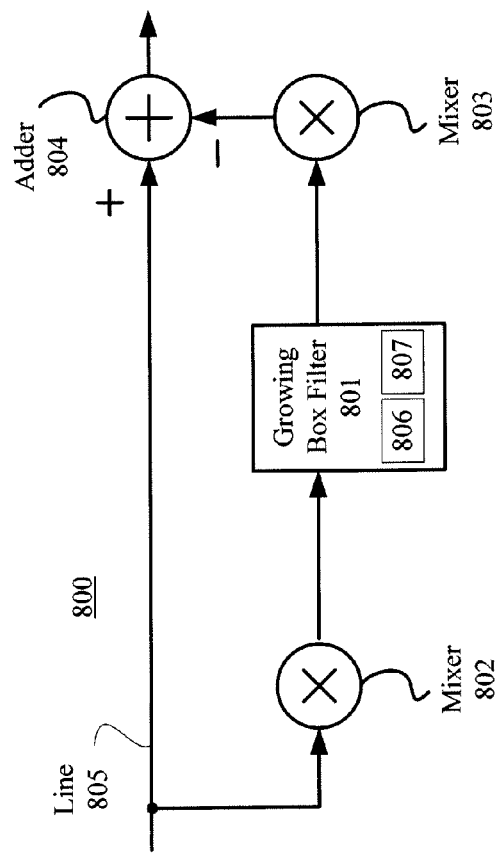
FIG. 8A illustrates a filter system that includes a growing box filter used to cancel spurs.

Therefore, in accordance with one embodiment of the invention, a growing box filter, which is a form of a low-pa filter, can be used. FIG. 8A illustrates a system 800 including a growing box filter 801 that can estimate the spur using the following equation.

$$\hat{A}[k] = \frac{1}{n}\sum_{k=0}^{n-1} z[k]$$

Note that mixers 802/803, adder 804, and line 805 perform functions similar to mixers 702/703, adder 704, and line 705 (all of FIG. 7), and therefore are not explained in detail herein.

Growing box filter 801 can advantageously function as an expandable low-pass filter. Thus, growing box filter 801 can initially be sized relatively small, thereby minimizing delay in providing spur estimation. Additionally, growing box filter 801 can use all the data up to the current symbol, thereby increasing the accuracy of its spur estimation over time.

Figure 8B:
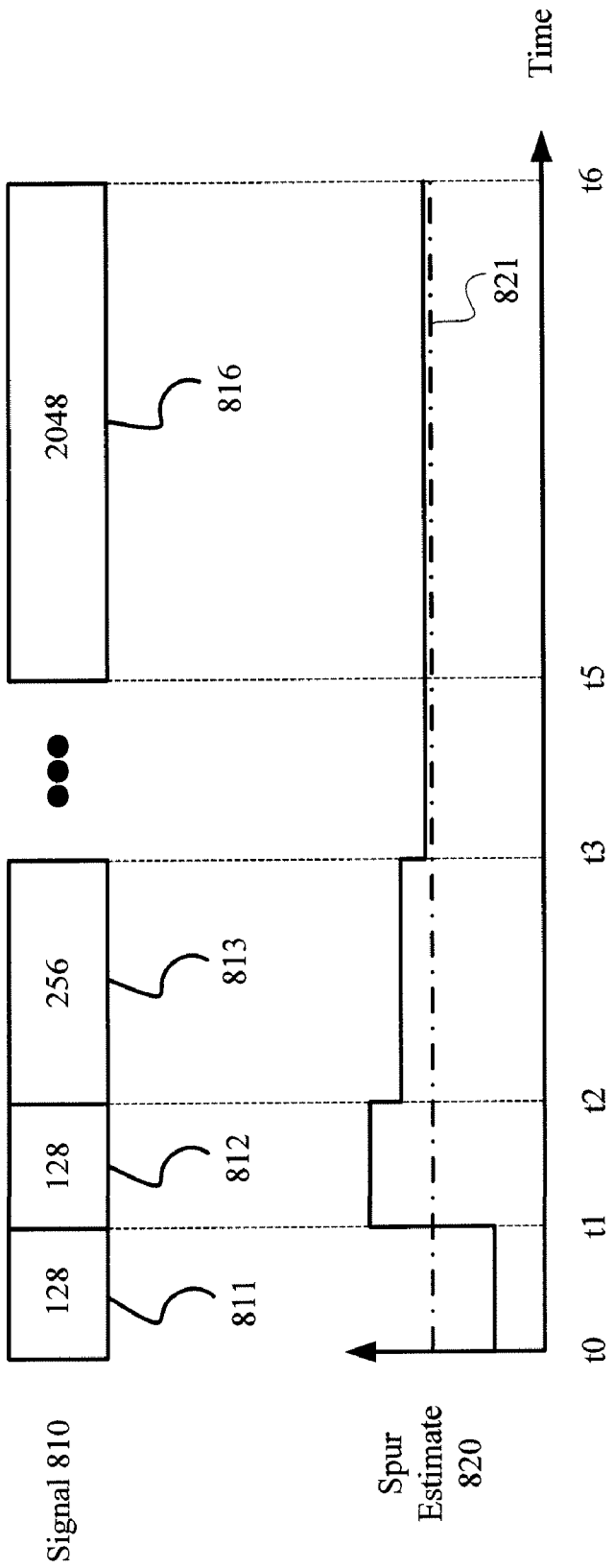
FIG. 8B illustrates the operation of an exemplary growing box filter.

FIG. 8B illustrates the operation of an exemplary growing box filter. Signal 810 indicates the number of samples taken each sample period whereas spur estimate 820 indicates the value of $\hat{A}$ (see equation above), which is refined based on those samples. The size of the growing box filter for processing each set of samples effectively balances the desire to minimize latency while increasing the accuracy of spur estimate 820. Specifically, in one embodiment, the sample size during each sampling period can be increased to provide a doubling of total sample size. Thus, for example, a first sample set 811 (sampling period between t0 and t1) can be sized to have only 128 samples, a relatively small number of samples. To provide a doubling of the total sample size (i.e. provide a total sample size of 256 samples), the next sample set 812 (sampling period between t1 and t2) can have 128 samples. At this point, to provide a doubling of the total sample size (i.e. provide a total sample size of 512 samples), the next sample set 813 (sampling period between t2 and t3) can be increased to have 256 samples. After two subsequent sample sets (not shown, but used during sampling periods between t3 and t5), another sample set 816 (sampling period between t5 and t6) can be increased to have 2048 samples (thereby providing a total sample size of 4096 samples).

As appreciated from the above-described embodiment, because latency and accuracy generally have an inverse relationship (i.e. the shorter the latency, the less accurate the result), the growing box filter can initially be sized small and then quickly increased in size to improve accuracy. In one embodiment, a maximum growing box filter length can be set to limit the latency of the filtering operation. In another embodiment, the filter length can be increased until spur estimate 820 exhibits a substantially similar value over a predetermined number of sampling periods (described below in further detail).

In accordance with one feature of the invention and referring to FIGS. 8A and 8B, growing box filter 801 can be efficiently implemented by including two accumulators for processing the samples of signal 810, i.e. a first accumulator 806 for generating a cumulative sum cs[n] and a second accumulator 807 for generating a total sum ts[n]. In accordance with the embodiment shown in FIG. 8B, when n is a power of 2, the total sum can be updated by adding the cumulative sum to the current total sum, and the cumulative sum can be reset.

Define $lf(n) \equiv 2^{\lfloor log_2(n) \rfloor}$, where $\lfloor x \rfloor$ is the largest integer that is smaller than or equal to x.

Suppose $m_0$ is the size of the first filter (128 in the example). Then cs[n] and ts[n] are given in the following equations $$\text{If } n < m_0, \; cs[n] = \sum_{k=1}^{n} z[k]; \; ts[n] = 0$$

$$\text{If } n \geq m_0, \; cs[n] = \sum_{k=lf(n)+1}^{n} z[k]; \; ts[n] = \sum_{k=1}^{lf\,n} z[k]$$

Thus, for example, at time t1, first accumulator 806, which has generated the cumulative sum from time t0 to t1, adds that cumulative sum to the total sum that is generated by second accumulator 807 and then resets itself to zero. Note that if time t1 is the first sample time, then the total sum immediately preceding time t1 is zero and the total sum at time 1 is equal to the cumulative sum. At time t2, first accumulator 806 adds its new cumulative sum (i.e. from time t1 to time t2) to the total sum (at this point including only the first cumulative sum from time to time t1) that is generated by second accumulator 807 and then once again resets itself to zero.

In one embodiment, spur estimate 820 can be computed by taking an average of the total sum, i.e. the total sum divided by the total number of samples to the current symbol. As shown in FIG. 8B, spur estimate 820 can change its value based on the average total sum computed at each sampling time. Of importance, with each sampling time, the value of spur estimate 820 is refined. Thus, at some point in time, the value of spur estimate converges to its actual value. For example, in FIG. 8B, the value of spur estimate 820 is substantially similar at times t3 and t4. In one embodiment, if spur estimate 820 exhibits little change within a given time interval (e.g. if the absolute difference is less than a predetermined threshold or if the relative error is within +/−10%), then that value can be used as the actual spur value (e.g. indicated by line 820).

Channel Interpolation

Figure 9A:
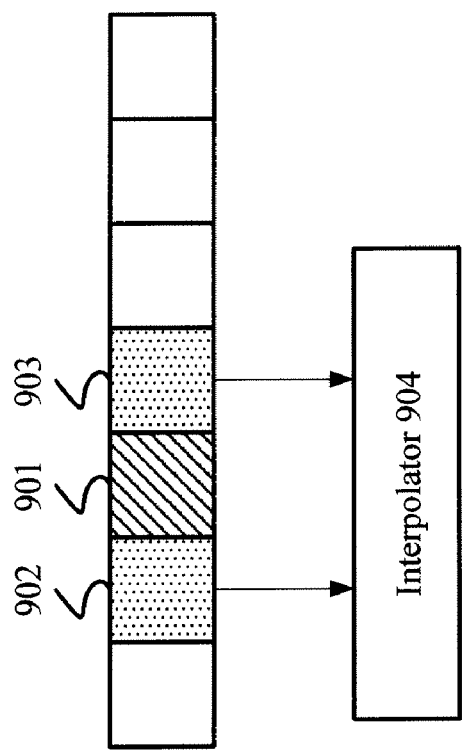
FIGS. 9A and 9B illustrate techniques for determining an average sub-channel estimate for one or more sub-channels including or affected by a spur based on interpolating sub-channel estimates for adjacent sub-channels.
Figure 9B:
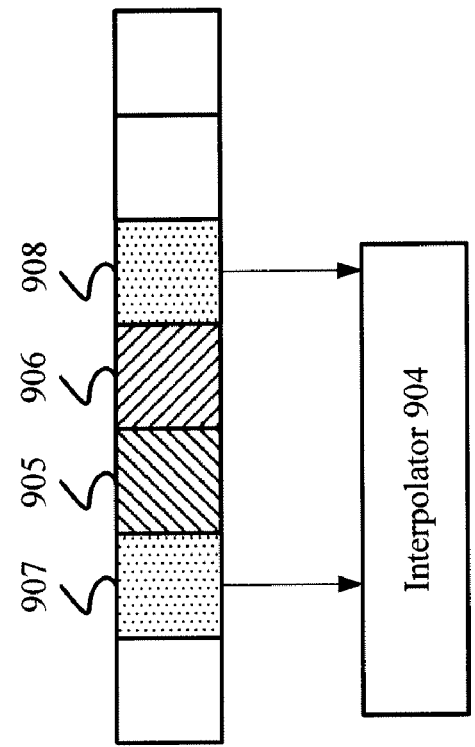

Channel estimates at spur locations are generally distorted. Therefore, in accordance with one embodiment of the invention, a pseudo channel estimate for a sub-channel known to coincide with a spur location can be computed by interpolating the channel estimates of adjacent good sub-channels. For example, in one embodiment shown in FIG. 9A, an average sub-channel estimate for 901 (which includes a spur) could be computed in an interpolator 904 using the sub-channel estimates for adjacent sub-channels 902 and 903 (i.e. sub-channels left and right of the sub-channel including the spur). In another embodiment shown in FIG. 9B, an average sub-channel estimate for sub-channel 905 (which includes a spur) as well as sub-channel 906 (which is adversely affected by the spur in sub-channel 905) could be computed in interpolator 904 using the sub-channel estimates for adjacent sub-channels 907 and 908 (i.e. sub-channels left and right of the bad sub-channels). Note that this channel interpolation can be performed before using a channel smoothing filter, thereby preventing sub-channel estimation errors from propagating to neighboring sub-channels.

Note that the number of adjacent sub-channels used to provide the interpolated sub-channel estimate can be varied based on multipath conditions. Specifically, using only two adjacent sub-channels for interpolation wherein at least one of the two sub-channels is affected by multipath can distort sub-channel estimation. However, too much interpolation, e.g. using multiple adjacent sub-channels all affected by multipath, can also distort the interpolated sub-channel estimate. Therefore, in one embodiment, the amount of interpolation (i.e. the number of adjacent sub-channels used for the interpolated sub-channel estimate) can be determined based on multipath effects on specific sub-channels.

Self-Correlation

Of importance, spurs can adversely affect many types of symbols. For example, in addition to affecting data symbols as explained above, spurs can also adversely affect the shorts of an OFDM signal. In general, these shorts have known periodicity. Specifically, in the 802.11a/802.11g OFDM shorts, twelve tones (complex sinusoids) are spaced (peak to peak) at 1.2 MHz with a period of 0.8 μs. Therefore, looking for periodicity of 0.8 μs (hence the term self-correlation) is very effective in detecting a packet, determining timing (i.e. symbol boundary between shorts and longs), and estimating frequency offset between the transmitter and the receiver.

Unfortunately, because the spur can have a substantially similar periodicity, the spur can corrupt self-correlation output more than white noise. For example, channel 6 in 802.11g has a center frequency of 2.437 GHz and a spur of 2.432 GHz. Therefore, in baseband, the spur would be at −5 MHz (i.e. 2.432-2.437 GHz), which would appear periodic with 0.2 μsec and thus also with 0.8 μsec (the period of the shorts).

Figure 10A:
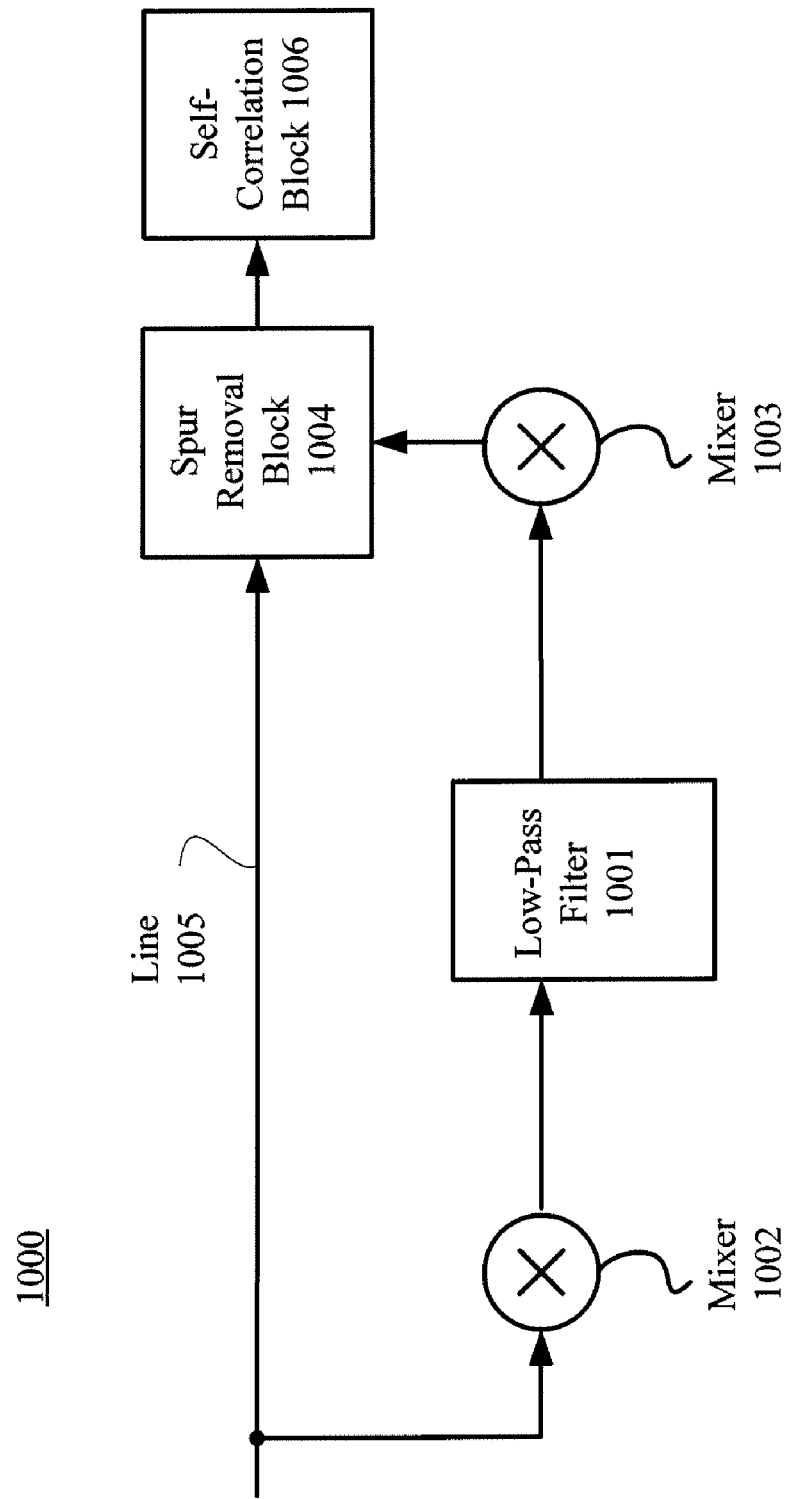
FIGS. 10A and 10B illustrate exemplary filter systems that can cancel the spur effect from self-correlation of the signals.

In accordance with one feature of the invention, a low-pass filter can be used in combination with self-correlation to effectively cancel the spur effect. FIG. 10A illustrates an exemplary filter system 1000 that can advantageously include a self-correlation block 1006 to facilitate canceling the spur effect. Note that the filtering described in reference to FIG. 7 can be equally applied in this system. Specifically, mixers 1002/1003, low-pass filter 1001, and line 1005 perform substantially the same functions as mixers 702/703, low-pass filter 701, and line 705, as described above in reference to FIG. 7.

Note that low-pass filter 1001 does not have to be very narrow because shorts do not occupy every frequency sub-channel. Specifically, shorts have data every fourth sub-channel. Thus, losing one sub-channel of the shorts does not give much loss in performance because the receiver is not trying to decode shorts, but instead utilizing their periodicity.

In one embodiment, spur removal block 1004 can directly cancel the spur from the received signal. In this technique, spur removal block 1004 can compute w[n] (see equations in reference to FIG. 7), wherein x[n] is the time-domain signal of the shorts. Thus, in this embodiment, spur removal block 1004 can perform substantially the same function as adder 704 (FIG. 7). After spur cancellation, self-correlation block 1006 can then compute self-correlation of spur-removed signals based on the following equation.

$$sc[n] = \sum_{k=n}^{n+31} w[k]^* w[k+32]$$

Figure 10B:
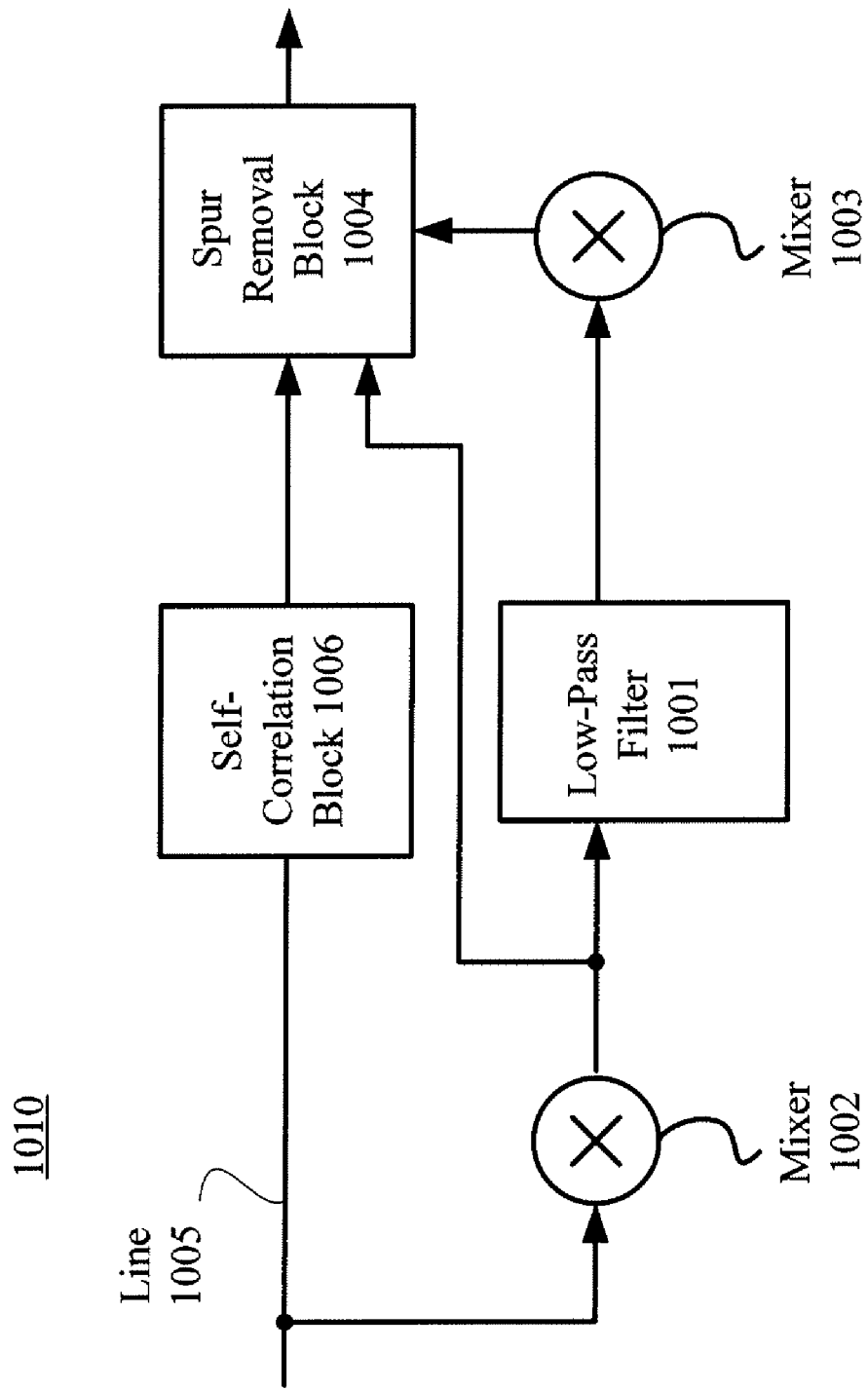

In another embodiment shown in FIG. 10B, the spur effect can be canceled from self-correlation. Specifically, during signal arrival on line 1005, the spur can be estimated using low-pass filter 1001 at the same time self-correlation is being performed by self-correlation block 1006. In this technique, the spur effect can be canceled for each sample, thereby eliminating a possible latency due to spur estimation.

This self-correlation technique determines what the spur would have done to the self-correlation performed by self-correlation block 1006 on the received signal on line 1005. Note that this technique includes storing the information regarding the 32 samples to accurately perform the self-correlation.

This "spur-less" self-correlation sc[n] can be appreciated by transforming the equation immediately above (rewritten in expanded form in the first below equation) into an intermediate equation (second below equation), and finally into the third below equation.

$$sc[n] = \sum_{k=n}^{n+31} \left(y[k] - \hat{A}e^{j2\pi f_s kT}\right)^* \left(y[k+32] - \hat{A}e^{j2\pi f_s(k+32)T}\right)$$

$$= \sum_{k=n}^{n+31} y^*[k]y[k+32] + \sum_{k=n}^{n+31} |\hat{A}|^2 e^{j2\pi f_s 32T} -$$

$$\sum_{k=n}^{n+31} y^*[k]\hat{A}e^{j2\pi(k+32)T} - \sum_{k=n}^{n+31} \hat{A}^* e^{-j2\pi f_s kT} y[k+32]$$

$$= \sum_{k=n}^{n+31} y^*[k]y[k+32] + 32|\hat{A}|^2 e^{j2\pi f_s 32T} -$$

$$\hat{A}e^{j2\pi f_s 32T} \sum_{k=n}^{n+31} z^*[k] - \hat{A}^* e^{j2\pi f_s 32T} \sum_{k=n}^{n+31} z[k+32]$$

Thus, self-correlation of the received signal can be computed using the following equation.

$$sc\_y[n] = \sum_{k=n}^{n+31} y^*[k]y[k+32]$$

It logically follows that the effect of a spur from self-correlation can then be canceled using the following equation.

$$sc[n] =$$

$$sc\_y[n] + 32|\hat{A}|^2 e^{j2\pi f_s 32T} - \hat{A}e^{j2\pi f_s 32T} \sum_{k=n}^{n+31} z^*[k] - \hat{A}^* e^{j2\pi f_s 32T} \sum_{k=n}^{n+31} z[k+32]$$

In one embodiment, to normalize the self-correlation output, the power can also be adjusted using the following equations, wherein the first below equation can be applied to FIG. 10A and the second below equation can be applied to FIG. 10B.

$$pw[n] = \sum_{k=n}^{n+31} \left|y[k] - \hat{A}e^{j2\pi f_s kT}\right|^2 + \left|y[k+32] - \hat{A}e^{j2\pi(k+32)T}\right|^2$$

$$= \sum_{k=n}^{n+31} |y[k]|^2 + |y[k+32]|^2 + 64|\hat{A}|^2 - 2\sum_{k=n}^{n+31} \text{Re}\{\hat{A}(z_k^* + z_{k+32}^*)\}$$

In other words, power adjustment can be done either by canceling the spur directly from the received signal or by removing the spur contribution from the power computed directly with the received signal.

In accordance with one aspect of the invention, it is recognized that the type and extent of performance degradation can depend on the data rate of the signal being received. For example, in general, a spur occurring with a high data rate signal will primarily affect data decoding, whereas a spur with occurring with a low data rate signal will primarily affect signal detection, timing, and frequency offset estimation. Moreover, irrespective of data rate, spurs close to any pilots or data used for tracking will affect pilot tracking.

Thus, as explained in detail above, the techniques used to mitigate the effects of spurs can be tailored to match the data rate of the received signal. For example, the techniques that ignore the spurs (i.e. pilot masks, Viterbi masks, and channel interpolation) can provide particularly effective solutions for received signals having a high data rate. The spur filtering technique can also provide an effective solution for received signals having a high data rate. In contrast, the self-correlation technique can provide a particularly effective solution for received signals having a low data rate.

OTHER EMBODIMENTS

Although illustrative embodiments have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art.

Figure 4A:
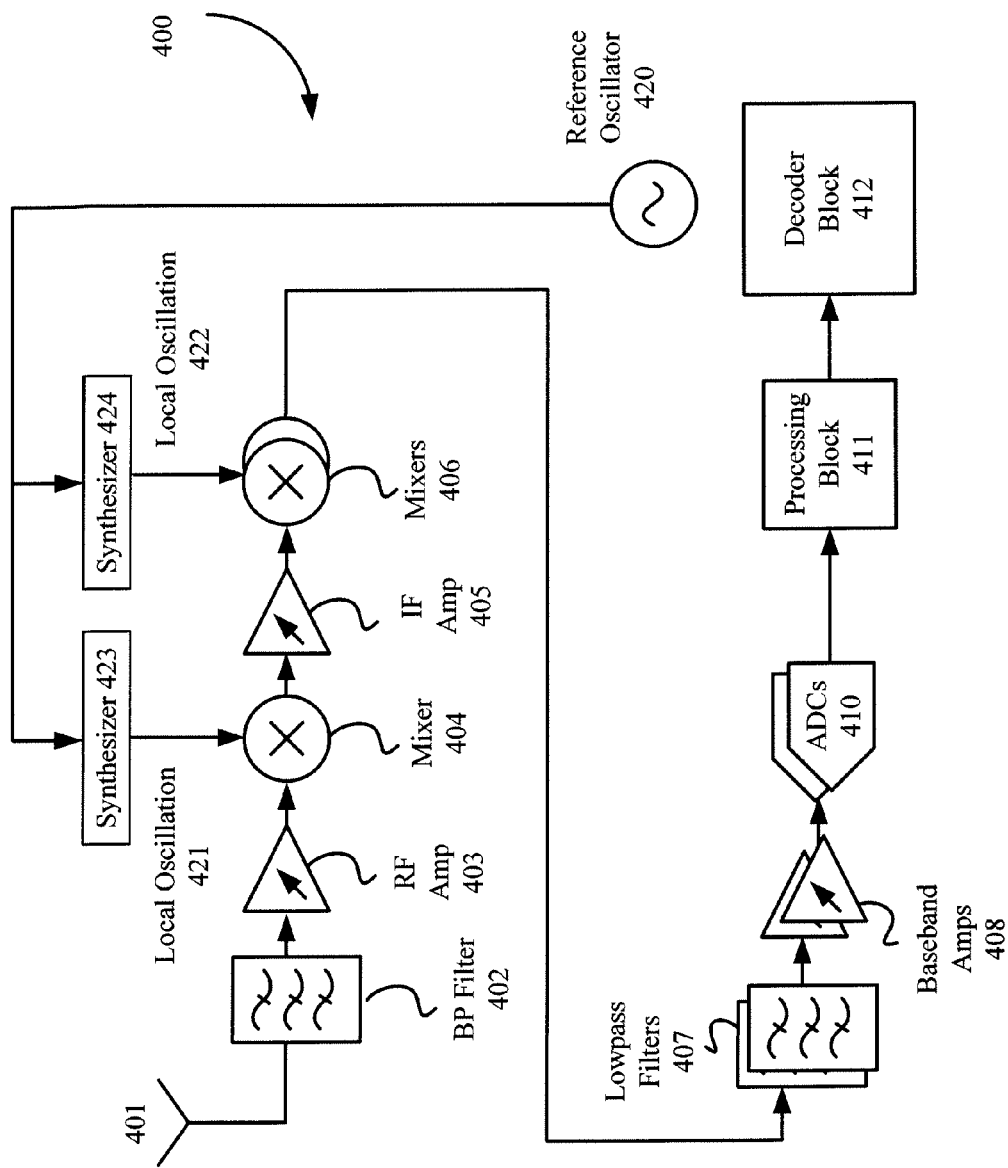
FIG. 4A illustrates a simplified receiver for receiving signals in a WLAN environment.
Figure 4B:
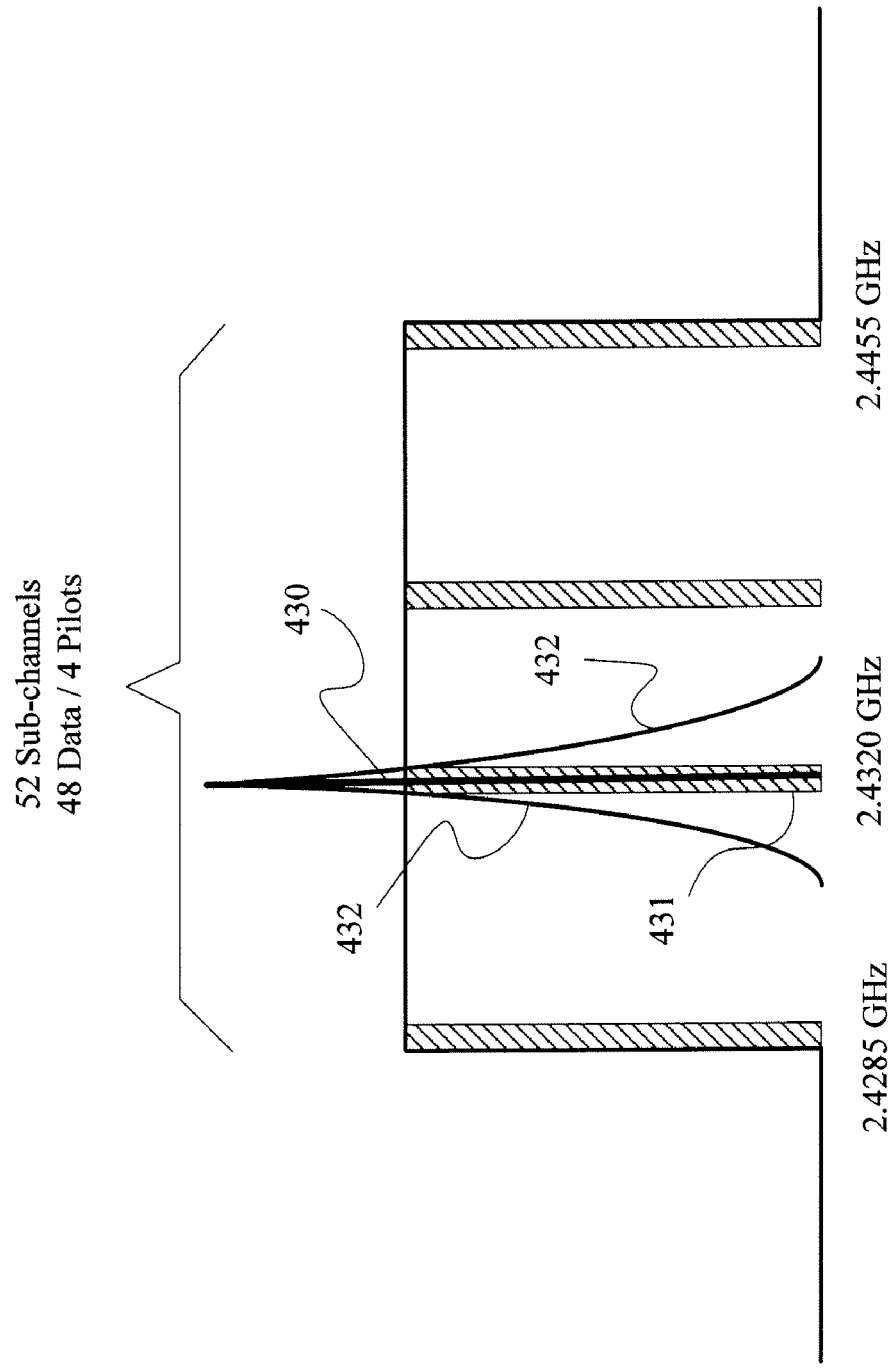
FIG. 4B illustrates an exemplary spur in a specific band.

For example, the techniques described herein are equally applicable to zero IF (i.e. a direct conversion) architecture. Thus, referring to FIG. 4A, in a zero IF architecture, IF amplifier 405, mixers 406, and synthesizer 424 could be removed. In this case, the techniques for ignoring or canceling spurs can still be applied to any spurs in the harmonics generated by synthesizer 423.

In accordance with another aspect of the present invention, the spur mitigation techniques can be applied to spurs generated by a transmitter. Note that the frequency offset between the transmitter and the receiver oscillators should be determined and corrected before application of a spur mitigation technique, thereby ensuring accurate transmitter spur mitigation at the receiver.

In accordance with another aspect of the present invention, even if the exact frequency of the spur is not known (i.e. non-synchronous spurs), a smaller in time, wider in frequency box filter can be used to isolate the spur. Then, a frequency estimator can be used to determine the exact spur frequency. Once this preliminary frequency estimation is performed, then any of the above-described techniques can be used to provide spur mitigation.

Accordingly, it is intended that the scope of the invention be defined by the following Claims and their equivalents.

The invention claimed is:

1. A method of improving a sub-channel estimate for a received signal, the method comprising:
   determining sub-channel estimates for a plurality of sub-channels of the received signal; and
   if a first sub-channel includes a spur, then ignoring the determined sub-channel estimate of the first sub-channel, computing an interpolated sub-channel estimate based on sub-channels adjacent the first sub-channel, and providing the interpolated sub-channel estimate as the sub-channel estimate for the first sub-channel.

2. The method of claim 1, wherein the sub-channels adjacent the first channel include two channels disposed immediately adjacent the first channel.

3. The method of claim 1, wherein the sub-channels adjacent the first channel include at least one channel immediately adjacent the first channel and at least one other channel not immediately adjacent the first channel.

4. The method of claim 1, wherein the sub-channels adjacent the first channel include a second channel left of the first channel and a third channel right of the first channel.

5. The method of the claim 4, wherein only one of the second and third channels is immediately adjacent the first channel.

6. The method of claim 1, wherein at least a second channel is adversely affected by the spur in the first channel, and wherein the sub-channels adjacent the first channel include a third channel adjacent the first channel and a fourth channel adjacent the second channel.

7. The method of claim 6, wherein the third channel is immediately adjacent the first channel.

8. The method of claim 6, wherein the fourth channel is immediately adjacent the second channel.

9. The method of claim 1, further including using a channel smoothing filter, which is performed subsequent to providing the interpolated sub-channel estimate as the sub-channel estimate for the first sub-channel.

10. The method of claim 1, wherein a number of the sub-channels adjacent the first channel is varied based on multipath conditions.

* * * * *